United States Patent Office 3,307,113
Patented Feb. 28, 1967

3,307,113
MULTIPASS NONREGENERATING LASER AMPLIFIER CRYSTAL
Richard Swart Hughes, Riverside, Calif., assignor to the United States of America as represented by the Secretary of the Navy
Filed Aug. 10, 1965, Ser. No. 478,776
2 Claims. (Cl. 330—4.3)

The invention described herein may be manufactured and used by or for the Government of the United States of America for governmental purposes without the payment of any royalties thereon or therefor.

The present invention relates generally to improvements in laser amplifying crystals, and more particularly to an improved nonregenerating laser crystal having a geometry such that a laser beam is caused to be amplified in a nonregenerative mode while making multiple passes through the crystal.

Laser amplifiers are well-known and may be classified according to their mode of amplification. Generally speaking, laser light amplifiers are categorized as either regenerating or nonregenerating amplifiers. Regenerating amplifiers employ reflecting mirrors, disposed at either end of a resonating cavity, or capitalize on the inherent 7.6% reflectivity of air-to-ruby interfaces disposed at either end of a resonating cavity to initiate additional stimulation of reflected photons. Nonregenerating amplifiers do not employ a resonating cavity and must effect amplification or increased photon stimulation as laser light is caused to make single pass through the crystal. Consequently, the efficiency of a nonregenerating amplifying crystal is, for many purposes, below a satisfactory level.

In attempting to employ nonregenerating crystals as laser amplifiers two solutions have heretofore been proposed for enhancing amplification of laser light. The first requires a series of coaxially aligned crystals through which a laser beam is directed so that a cumulative gain may be realized. This solution has not proven completely satisfactory since, for a ruby crystal, there is experienced a 7.6% loss at each ruby-to-air interface, due to the inherent reflectance characteristic of a ruby-to-air interface. It has been suggested that this deficiency may be overcome through the use of anti-reflection coatings applied to the interfaces of each of the crystals. However, as is well-known, such coatings are of only a limited value as they tend to decay when subjected to operative conditions due, in part, to the known destructive effects of laser light.

The second solution, heretofore proposed, is to increase the over-all length of a single crystal. This proves to be impractical when employed for normal usage. Among the various disadvantages found when utilizing crystals of increased length is that the flash tube, or lamp, employed to pump such crystals must be of a length operatively matched with the crystal. This then requires a lamp of increased length. The resulting combination comprises an expensive, bulky, and generally impractical device.

Therefore, it is the purpose of the instant invention to provide a nonregenerating laser amplifier which overcomes the above-noted deficiencies and to provide a practical solution to the problem of enhancing the gain of nonregenerating laser amplifiers.

It is an object of the invention to provide a simple, economic and practical laser amplifying crystal for amplifying laser light in a nonregenerating mode.

Another object of the invention is to provide a single crystal wherein a laser beam is caused to progress along parallel paths for achieving laser light amplification in a nonregenerating manner.

A further object is to provide an amplifying crystal of decreased length which has a capability for amplifying laser light equivalent to that of a crystal of an increased length.

Other objects, advantages and novel features of the invention will become apparent from the following detailed description of the invention when considered in conjunction with the accompanying drawings wherein.

Turning now to the drawings, wherein like references characters designate like or corresponding parts throughout the several views, there is shown in FIG. 1 a laser crystal designated generally by reference character C.

Figure 1:
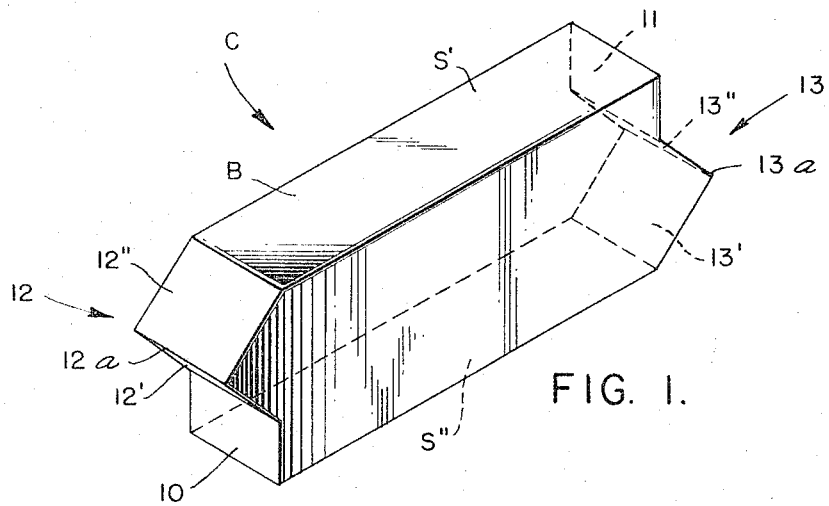
FIG. 1 is a perspective view of the amplifier of the instant invention.

The crystal C comprises an elongated generally rectangular body B, the ends of which are so formed as to provide a plurality of transversely positioned, polished surfaces comprising a pair of crystal-to-air interfaces 10 and 11 and at least one pair of roof-top prisms 12 and 13. The interfaces 10 and 11 serve as ingress and egress portions of the crystal and are positioned in offset relation in parallel planes disposed at opposite ends of body B and adjacent to opposed side surfaces S' and S" thereof. The roof-top prism 12 includes a pair of plane surfaces 12' and 12" intersecting at right angles at an apex 12a. Prism 13 is similarly formed with a pair of plane surfaces 13' and 13" and an apex 13a.

Figure 2:
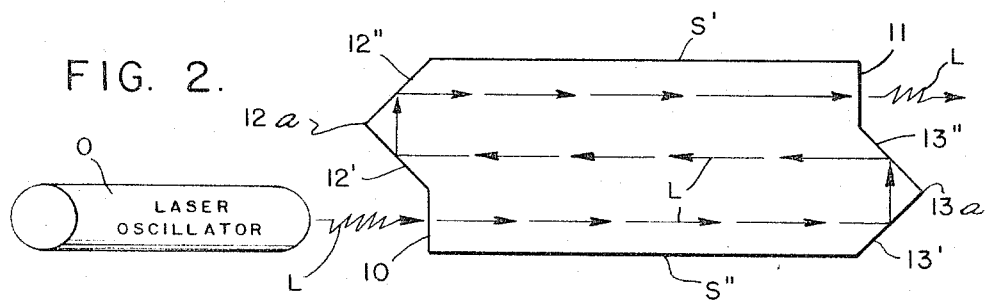
FIG. 2 is a schematic view of the amplifier of FIG. 1, illustrating a path followed by a laser light beam as it is caused to progress therethrough.

The purpose of each of the prisms 12 and 13 is to impose a 180° fold on a laser light beam L, FIG. 2, as it progresses from the ingress portion of the crystal C, at the interface 10, to the egress portion of the crystal, at the interface 11. Therefore, each of the plane surfaces 12', 12", 13' and 13" forms a total internal reflecting surface interposed in the path of the beam of light L, upon which the beam is caused to impinge with an angle of incidence of 45°.

Hence, it will be appreciated that there is provided at least one roof-top prism and an interface disposed in juxtaposition at each end of the crystal and that each prism is so positioned that one plane surface thereof is opposite and parallel to one plane surface of the other prism, while the other plane surface thereof is opposite to and at an angle 45° with one of the interfaces. While only two prism members are shown in the drawing, it is to be understood that the crystal may be provided with any suitable number of like members, so arranged as to fold the beam of light L as many times as is found desirable. The number of passes through the crystal made by the light as it progresses from the interface 10 to the interface 11 is always determined by the equation $P = M + 1$, where M represents the number of prism members, and P represents the number of passes.

In operation, a laser light beam L, FIG. 2, will be projected from an optically aligned laser oscillator O. The beam L enters the crystal C through the crystal-to-air interface 10 and progresses along a first path through the body B to impinge on the reflecting surface 13', of the roof-top prism 13 with an angle of incidence of 45°, thus making a first pass through the crystal. The beam of light L is then reflected from the surface 13' at an angle of 45° to impinge upon the surface 13" with an angle of incidence of 45°. The light beam L is then reflected at angle of 45° at surface 13" and progresses in a second pass through the body B, along a second path extending between the roof-top prism members 13 and 12 and parallel to the first path taken by the light.

The beam of light L is then reflected from the surfaces 12' and 12'', in a similar manner to progress along a third pass to egress from the crystal at the interface 11 in an amplified state. More roof-top prisms may be provided for increasing the number of passes through the body B, as desired.

It has been found that it is possible to effectively and efficiently amplify laser light that is selectively polarized, by use of the anti-reflection properties of Brewster angle incidence. The use of the Brewster angle incidence at the ingress and egress interfaces will eliminate losses due to reflection at the interfaces and may be applied to certain laser amplifier materials. The Brewster angle is a function of the index of refraction of the material and hence varies with the type of material used.

Figure 3:
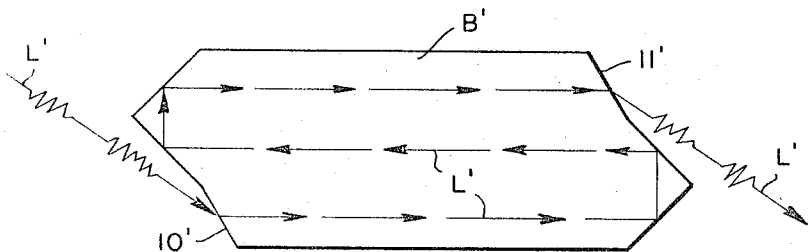
FIG. 3 is a schematic view of a modified form of the invention which is readily adaptable for use in amplifying selectively polarized laser light.

Turning now to FIG. 3, there is illustrated a crystal body B', somewhat similar to crystal body B but provided with Brewster angle incidence for amplifying polarized laser light. As a specific example, when the material of the crystal body B' is of ruby, ingress interface 10' and egress interface 11' are parallel but disposed at an angle of 29°34' with respect to a normal to the longitudinal axis of the body B'. This arrangement for the interfaces 10' and 11' accommodates a bending of the path of polarized light L impinging with an angle of incidence equal to the Brewster angle of 60°26'. The bending of the path serves to direct the light parallel to the longitudinal axis of the crystal, similar to the manner hereinbefore described.

In view of the foregoing, it will be appreciated that the present invention provides a simple, multipass, non-regenerative device of a decreased over-all length for amplifying laser light with increased efficiency, as the light is caused to make a plurality of nonregenerating passes through the crystal.

Obviously many modifications and variations of the present invention are possible in the light of the above teachings. It is therefore to be understood that within the scope of the appended claims the invention may be practiced otherwise than as specifically described.

What is claimed is:

1. A multipass nonregenerating laser amplifier crystal comprising:
    an elongated crystal body having exterior planar surfaces;
    a first end for the body including means defining a first crystal-to-air interface perpendicular to the longitudinal axis of said crystal and adapted to serve as an ingress portion of the crystal for receiving laser light and directing the light in a first pass along a first longitudinal path extending parallel to said longitudinal axis of the body and terminating at a second end of the body;
    a first total internal reflecting surface disposed at the second end of the crystal body arranged diagonally across said first longitudinal path for directing the light along a first transverse path at right angles to said first longitudinal path;
    a second total internal reflecting surface disposed diagonally across said first transverse path for directing the laser light in a second pass through the body along a second longitudinal path parallel to said first longitudinal path and extending to said first end of the crystal body;
    a third total internal reflecting surface disposed diagonally across said second longitudinal path for directing the laser light along a second transverse path at right angles to said first longitudinal path and extending in a common direction with said first transverse path;
    at least a fourth total internal reflecting surface disposed diagonally across said second transverse path for directing the laser light in a third pass through the crystal body along a third longitudinal path extending parallel and in a common direction with said first longitudinal path to said second end of the body; and
    a second crystal-to-air interface parallel to said first crystal-to-air interface disposed across the third longitudinal path adapted to serve as an egress portion of the crystal for passing laser light from the crystal body.

2. A multipass nonregenerating laser amplifier crystal comprising: an elongated ruby crystal body having external planar surfaces; a first end for the body including means defining a first crystal-to-air interface disposed at an angle of 60 degrees and 26 minutes with respect to the longitudinal axis of the body and adapted to serve as an ingress portion of the crystal for receiving laser light and directing the light in a first pass along a first longitudinal path extending parallel to longitudinal axis of the body and terminating at a second end of the body; a first total internal reflecting surface disposed at the second end of the crystal body arranged diagonally across said first longitudinal path for directing the light along a first transverse path at right angles to said first longitudinal path; a second total internal reflecting surface disposed diagonally across said first transverse path for directing the laser light in a second pass through the body along a second longitudinal path parallel to said first longitudinal path and extending to said first end of the crystal body; a third total internal reflecting surface disposed diagonally across said second longitudinal path for directing the laser light along a second transverse path at right angles to said first longitudinal path and extending in a common direction with said first transverse path; at least a fourth total internal reflecting surface disposed diagonally across said second transverse path for directing the laser light in a third pass through the crystal body along a third longitudinal path extending parallel and in a common direction with said first longitudinal path to said second end of the body; and a second crystal-to-air interface parallel to said first crystal-to-air interface disposed across the third longitudinal path adapted to serve as an egress portion of the crystal for passing laser light from the crystal body.

References Cited by the Examiner
UNITED STATES PATENTS 3,154,751   10/1964   Wentz et al. _____ 330—4.3

OTHER REFERENCES

Masters: "Proc. IRE," February 1962, pages 220–221.

References Cited by the Applicant

Electronics, October 27, 1961, pp. 39–46.
Scientific American, July 1963, p. 34.
IEEE Spectrum, May 1964, pp. 144–45.
Technical Bulletin T 1261–1, Triton Inst. Inc.

ROY LAKE, *Primary Examiner.*

DARWIN R. HOSTETTER, *Assistant Examiner.*